(12) United States Patent
Al-Momin et al.

(10) Patent No.: US 9,329,291 B2
(45) Date of Patent: May 3, 2016

(54) NON-HYPERBOLIC CORRECTION OF SEISMIC DATA

(75) Inventors: Ali Ameen Al-Momin, Dammam (SA); Yi Luo, Dhahran (SA); Tong W. Fei, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 546 days.

(21) Appl. No.: 13/881,166

(22) PCT Filed: Nov. 4, 2011

(86) PCT No.: PCT/US2011/059301
§ 371 (c)(1),
(2), (4) Date: Jun. 5, 2013

(87) PCT Pub. No.: WO2012/064599
PCT Pub. Date: May 18, 2012

(65) Prior Publication Data
US 2013/0245956 A1  Sep. 19, 2013

Related U.S. Application Data

(63) Continuation-in-part of application No. 12/941,412, filed on Nov. 8, 2010, now abandoned.

(51) Int. Cl.
*G01V 1/28* (2006.01)
*G01V 1/36* (2006.01)

(52) U.S. Cl.
CPC .............. *G01V 1/362* (2013.01); *G01V 1/364* (2013.01); *G01V 1/28* (2013.01); *G01V 2210/52* (2013.01)

(58) Field of Classification Search
USPC ............................................. 702/6, 14, 17, 18
See application file for complete search history.

(56) References Cited

U.S. PATENT DOCUMENTS

| 4,210,968 A | 7/1980 | Lindseth |
| 4,887,244 A | 12/1989 | Willis et al. |
| 6,151,275 A | 11/2000 | Starr |
| 2009/0067287 A1* | 3/2009 | Berkovitch et al. ............. 367/40 |

OTHER PUBLICATIONS

Written Opinion of the International Searching Authority dated Jan. 31, 2012 issued in PCT/US11/059301.*
"Saudi Aramco—EXPEC Advanced Research Center".
OnePetro citation for "De-Blending Reverse Time Migration," copyright 2010.

(Continued)

*Primary Examiner* — Huan Tran
(74) *Attorney, Agent, or Firm* — Abelman, Frayne & Schwab

(57) ABSTRACT

A method for improving seismic images by correction of distortions in the underlying seismic data caused by a near-surface anomaly that produces a non-hyperbolic move-out component of the seismic reflection below the anomaly includes the steps of: a. redatuming the input seismic data to go from the surface to a target horizon using true one-way traveltime operators to provide a first new redatuming dataset; b. redatuming the input seismic data using hyperbolic one-way travel time operators to provide a second new redatuming dataset; and c. redatuming the combination of a first causal part of the first new redatuming dataset and an anti-causal second part of the second redatuming dataset to go from the target horizon back to the surface using hyperbolic one-way traveltime operators to provide a dataset that is referenced to the surface without an imprint of the anomaly.

12 Claims, 17 Drawing Sheets

(56) References Cited

OTHER PUBLICATIONS

OnePetro citation for "First Successful Multilateral Well Logging in Saudi Aramco Innovative Approach toward Loging an Open Hole Multilateral Oil Producer," copyright 2011.

Malik, Some practical aspects of prestack waveform inversion using a genetic algorithm: An example from the east Texas Woodbine gas sand,: Geophysics, vol. 64, No. 2, pp. 326.

Kelamis et al., "Velocity-independent redatuming: A new approach to the near-surface problem in land seismic data processing." The Leading Edge, Aug. 2002, pp. 730-735.

Flecha et al., "Imaging low-velocity anomalies with the aid of seismic tomography," Tectonophysics 388, 2004, pp. 225-238.

Mulder, W.A., "Rigorous redatuming,"Geophys. J. Int., 161, Royal Astronomical Society, 2005, pp. 401-415.

Al-Ali et al., "From tracked two-way reflection times to redatuming: an operator approach," SEG, San Antonio 2007 Annual Meeting, pp. 2600-2604.

\* cited by examiner

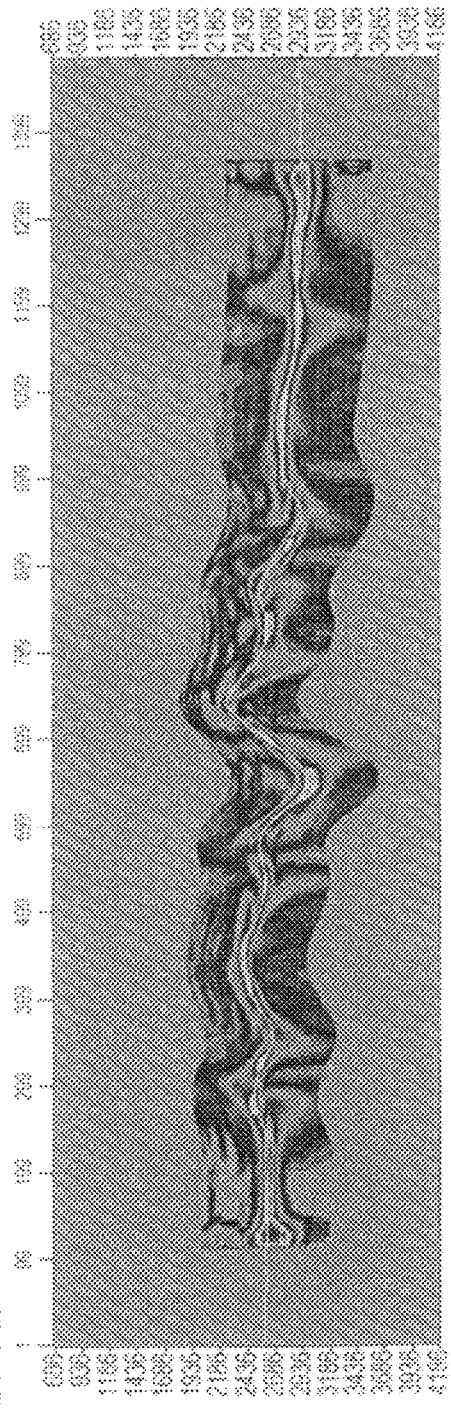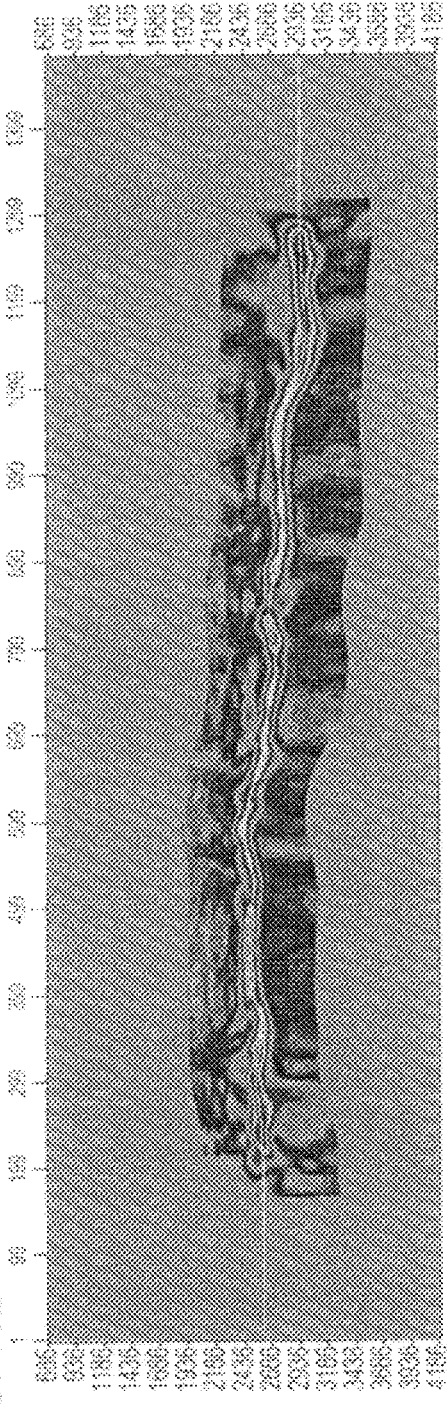

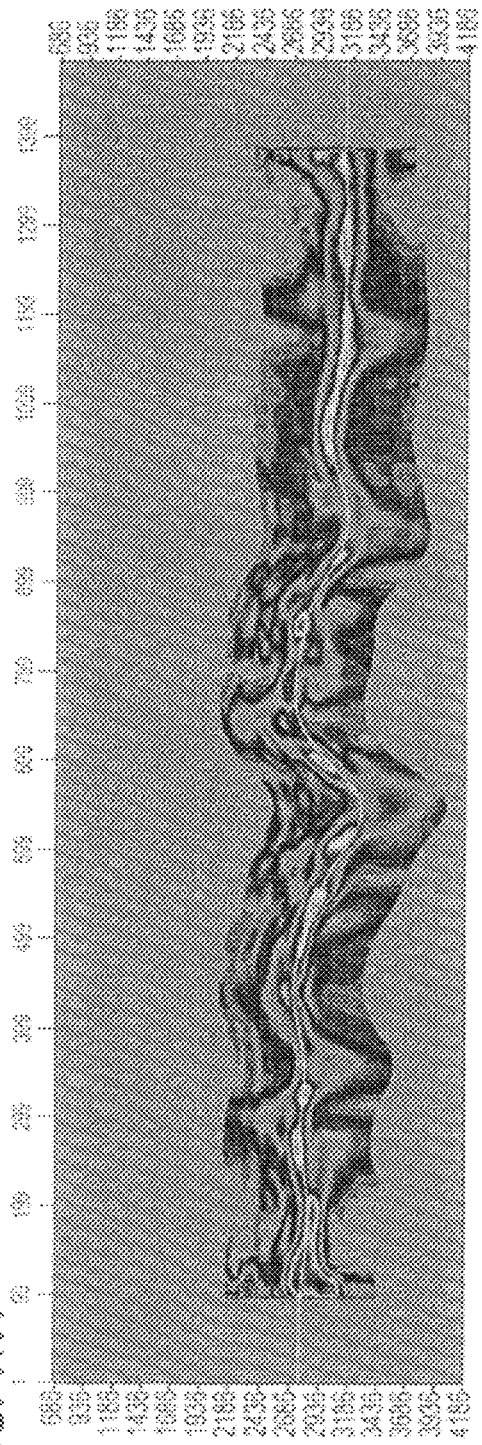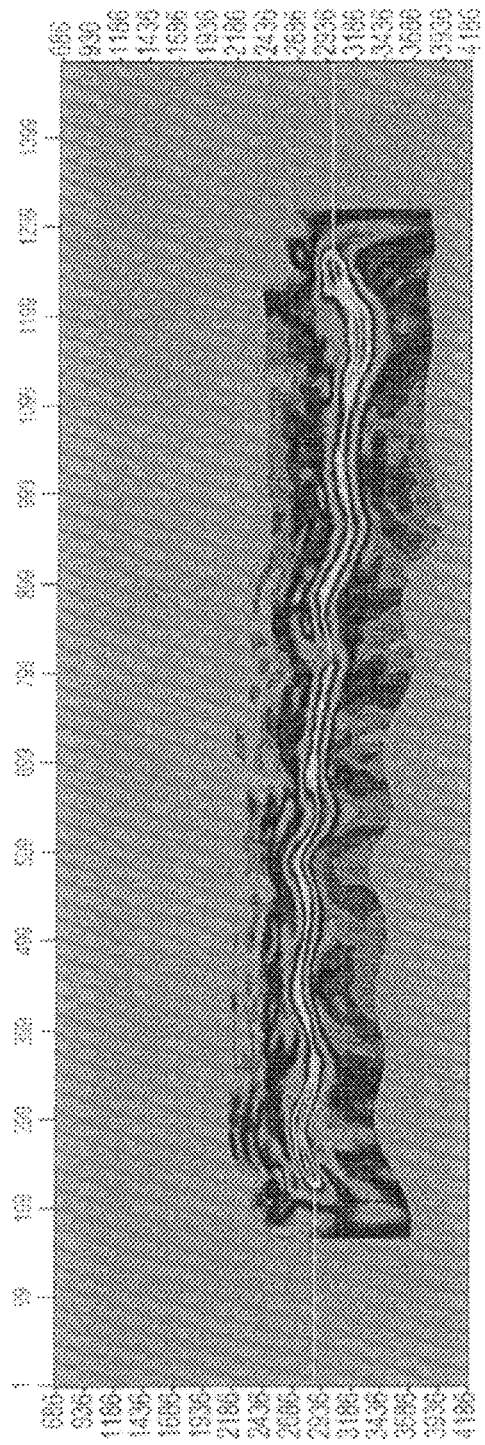

NON-HYPERBOLIC CORRECTION OF SEISMIC DATA

CROSS-REFERENCE TO RELATED APPLICATIONS

The present application is the national phase of PCT/US2011/059301, filed on Nov. 4, 2011, and claims priority on, as a continuation-in-part of, pending U.S. application Ser. No. 12/941,412, filed on Nov. 8, 2010.

FIELD OF THE INVENTION

This invention relates to seismic imaging, and in particular to a process for the correction of seismic data to minimize the effect of distortions caused by a near-surface anomaly that produces a non-hyperbolic move-out in the seismic reflection below that anomaly.

BACKGROUND OF THE INVENTION

A buried velocity anomaly produces a non-hyperbolic move-out in all the seismic reflection events below that anomaly. This non-hyperbolicity degrades the seismic image after stacking due to the fact that the anomaly imprint cannot be properly described by the stacking velocity function or static corrections. This distortion or deterioration can appear as a defocus or as a break in the seismic image.

Conventional time-imaging techniques such as stacking or migration use stacking velocity to describe the nature of seismic data. Stacking velocity is based on the assumption that all seismic events in the common mid-point domain can be described by hyperbolic functions. In other words, it assumes that the earth's layers in the seismic investigation region have very gentle transformations and contain low relief structures with minimal lateral velocity changes. However, this is hardly ever the case with land datasets that suffer from the complexities of weathered layers and buried velocity anomalies which cause the seismic events to be non-hyperbolic.

There are two major families of solutions which are commonly utilized to compensate for these complexities: statics solutions and solutions. In statics solutions, the main underlying assumption is the vertical ray-path assumption which means that a static shift is sufficient to remove the effect of the velocity anomaly. That is, a single value is applied to all of the different time samples of all the traces that share the same location. However, regardless of the method used to calculate the static solution, it is valid only if the anomaly is close to the earth's surface, that it is laterally smooth and is low in velocity. These assumptions don't hold in the case of complex near-surface or buried velocity anomalies and the static solution cannot accurately resolve the problem of clarifying the data.

Various methods have been proposed for resolving the problem of near-surface anomalies in order to provide more and cleaner data. For example, U.S. Pat. No. 6,151,275 discloses a method for separating seismic data into a first set of seismic data identified as upgoing seismic data, and a second set of seismic data identified as downgoing seismic data. The first and second sets of seismic data are redatumed to a target horizon to provide two sets of seismic data; the new sets are combined to create an image. Thus, this method tries to first separate the primaries from the multiples and then stacks them together after adjusting the datum difference between the two sets. The two sets of upgoing and downgoing data correspond, respectively to the primaries and first order multiples. Since no dataset is produced, it will be understood that the ultimate goal of the process described in this patent is to enhance the produced image by summing the primaries and multiples in the same image point without returning to the original surface of the data.

Redatuming solutions are much more accurate because they resolve the problem by calculating corrections that are dynamic in time, as well as in offset. One limitation of most redatuming algorithms is that they require the use of knowledge of the velocity-depth model of the near-surface which is very difficult to obtain in land datasets. The exception is common focus point (CFP) redatuming which requires only knowledge of the one-way traveltime operators to perform the redatuming. Traveltime operators are the one-way time that it takes the wave-field to travel from source/receiver point to a reflection point of a target horizon to which the data will be redatumed. However, CFP redatuming also has certain limitations, including the following:

a. the data above the target horizon is degraded because the redatuming process shifts all the anomalies to those shallower horizons;

b. the new dataset after redatuming has an unknown acquisition reference in location/depth that is the target horizon; and c. the new dataset after redatuming is different than the input dataset in reference time, as well as in the move-out behavior of the seismic events.

CFP-based redatuming is performed using one-way traveltime operators from the surface to a target horizon. The redatuming process produces a dataset which simulates a survey as though the sources and receivers were positioned at the chosen target horizon. Thus, if the target horizon is below the buried velocity anomalies, the redatuming process will shift the chosen imprints of the anomalies from below the target horizon to above the target horizon, which is referred to as the anti-causal part of the resulting data. The traveltime operators used in CFP redatuming, which are denominated true traveltime operators, exactly describe the target horizon in the one-way time domain. This means that if the data is converted to one-way time, e.g., by creating CFP gathers, or if the operators are converted to two-way time, e.g., by using Fermat's principle, a match should be obtained.

In order to illustrate the limitations of the corrective measures of the prior art methods, reference will be made to the simplified schematic illustration of FIG. 1 where a buried anomaly is positioned at "A".

It is clear that for a point source at $(x, z)=(0, h)$ and receivers at the surface, the effect of the buried anomaly will appear on the receiver from $x=xmin$ to $x=xmax$, where:

$$xmin = x0 \cdot h/(h-h0) \text{ and}$$

$$xmax = x1 \cdot h/(h-h0)$$

If "d" is the total distance where the effect is measured:

$$d = xmax - xmin = h \cdot (x1-x0)/(h-h0)$$

However, if h0 is very small or if h is very large, i.e., $h \gg h0$, then:

$$xmin = x0 \text{ and } xmax = x1$$

It is noted that xmin, xmax and d are dependent on h. This means that the effect of the buried velocity anomaly will vary in offset and value as a function of time. A static solution therefore cannot resolve this effect, even if trim statics were used, because of the dynamic nature of the problem.

In addition, it will be understood from the above equations that the only conditions where the effect is not dynamic are when the anomaly is very shallow or the horizon of interest is very deep. Static corrections will provide a satisfactory resolution for shallow anomalies; however, as is well known, although static corrections might resolve the problem for the very deep horizon, it is at the cost of the horizons closer to the anomaly. Another problem that arises with buried velocity anomalies is the possibility of having horizons above the anomaly, in which case, it is possible to resolve the problem for the deeper horizons, but the effect of the anomaly will be imposed on the horizons above it.

Referring to FIG. 2, a simple layered model is illustrated that is 5000 m wide with a buried velocity anomaly at x=2500 m. FIG. 3 depicts the reflected events in different CMP gathers which were calculated by ray tracing to illustrate the variable effect of the buried anomaly of FIG. 2. The common-mid-point (CMP) gathers were taken at x=2300 m, 2400 m and 2500 m.

The method of removing the effect of the buried velocity anomaly by CFP-based redatuming utilizes one-way traveltime operators from the surface to a selected target horizon. Referring to FIG. 4, there is depicted a simple layered model with a buried anomaly and its CMP gather. The left chart schematically depicts the sources (stars) and receivers (triangles) at the surface (h0) and a buried velocity anomaly (A) between horizons h1 and h2. The graph to the right depicts the offset for various CMP gathers. The redatuming process produces a dataset which simulates a survey as if sources and receivers were positioned at that target horizon.

The new dataset will have two parts: a causal part and an anti-causal part. The causal part shows the reflection coming from below the target horizon and the anti-causal part shows the reflection coming from above the target horizon. In order to remove the effect of a velocity anomaly from the deeper horizon, redatuming to any horizon that is below the anomaly is performed.

Referring now to FIG. 5, there is depicted a CMP gather after redatuming with true traveltime operators. Although the redatuming process successfully removed the anomaly from horizons 3 and 4 in FIG. 5, the redatuming imposed it on the horizons 0 and 1. Another problem is that this new dataset differs from the input data in two important ways. First, the new dataset has the target horizon flat at zero, which is considered to be undesirable by interpreters of the resultant image because they are used to looking at data from a smoothed surface. Second, the new stacking velocity is very different than the original stacking velocity, which means that the velocity analysis should be repeated from scratch.

It is therefore an object of the present invention to provide a process for the correction of seismic data to minimize the effect of distortions caused by a near-surface anomaly that produces a non-hyperbolic move-out in the seismic reflection below that anomaly.

SUMMARY OF THE INVENTION

The present invention is directed to a novel method that utilizes one-way traveltime operators to provide a correction of the portion of the non-hyperbolic seismic data that is attributable to the buried velocity anomaly. The method applies three common focus point (CFP) redatuming steps as follows:
 a. one redatuming step on the input seismic data to go from the surface to a target horizon using true one-way traveltime operators;
 b. one redatuming step on the input seismic data to go from the surface to the target horizon using hyperbolic one-way traveltime operators; and
 c. one redatuming step on the combined seismic data, which consists of the causal part from the first step and the anti-causal part from the second step, to go from the target horizon back to the surface using hyperbolic one-way traveltime operators.

BRIEF DESCRIPTION OF THE DRAWINGS

The invention will be further described below and the prior art has, to some extent, been described above with reference to the attached drawings in which:

FIG. 16 is a comparison between horizon velocity analysis at the indicated time before non-hyperbolic correction on the left side and after correction on the right side;

FIG. 17 is a comparison of the horizon velocity analysis similar to FIG. 16 for the indicated later time;

DETAILED DESCRIPTION OF THE INVENTION

The present invention, which will also be referred to herein as "non-hyperbolic correction" (NHC), uses one-way traveltime operators to achieve non-hyperbolic correction of the seismic data. Each redatuming process uses the method of common focus point, or CFP, redatuming.

Hyperbolic Operators

The traveltime operators used in CFP-based redatuming exactly describe the target horizon in one-way time domain. This means that if the data is converted to one-way time, e.g., by creating CFP gathers, or if the operators are converted to two-way time by using Fermat's principle, a match should be obtained. In accordance with the method of the present invention, a new set of operators, referred to as hyperbolic operators, are employed in the redatuming steps. Hyperbolic operators are the one-way time equivalent of the best fitting hyperbolas of the target horizon in the CMP domain. These hyperbolas are the part of the horizon that normal move-out (NMO) velocity can properly describe and stack. In this context, NMO error is the difference between the actual data and the best fitting hyperbolas. This error is the cause of the deterioration and breaking in the stacked image. Note that hyperbolicity in the two-way time domain does not mean hyperbolicity in the one-way time domain and hyperbolic operators are not themselves hyperbolic.

Hyperbolic operators do not describe the non-hyperbolicity of the buried velocity anomaly. If the data is redatumed from the surface to the target horizon using these hyperbolic operators, a new dataset is obtained that is similar to the dataset in FIG. 5, except that the anomaly imprint remains in the same horizons, i.e., horizon 3 and 4, and is not shifted to the shallower horizons.

Redatuming Back to the Surface

Figure 1:
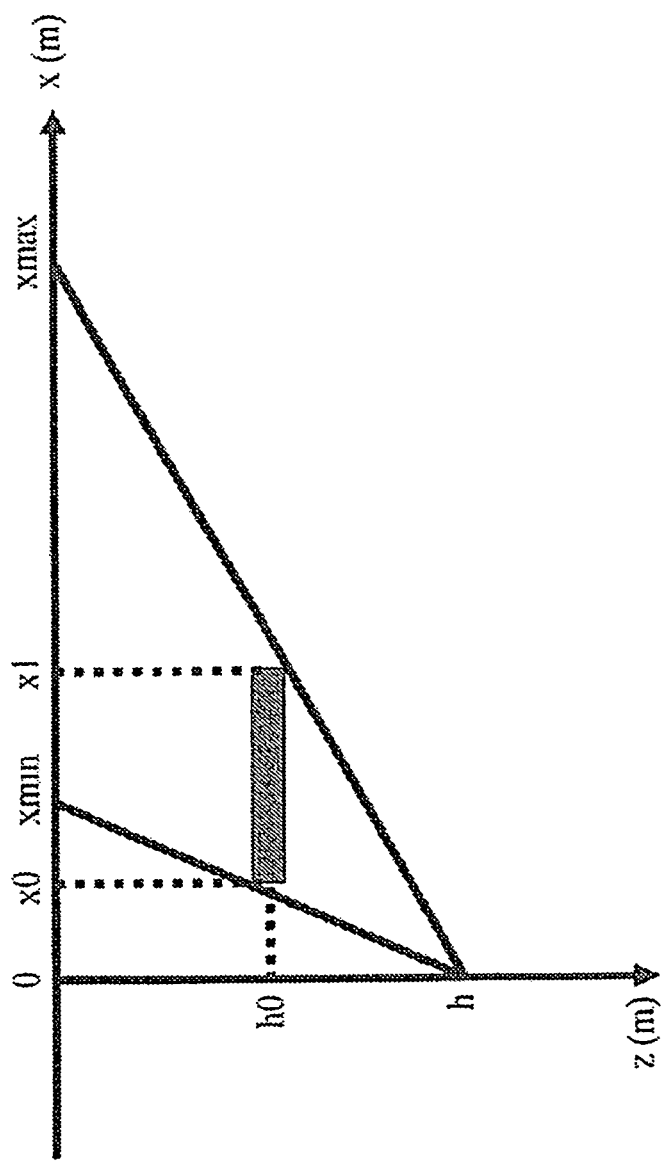
FIG. 1 is a schematic illustration in accordance with the prior art of the effect of a buried velocity anomaly.
Figure 2:
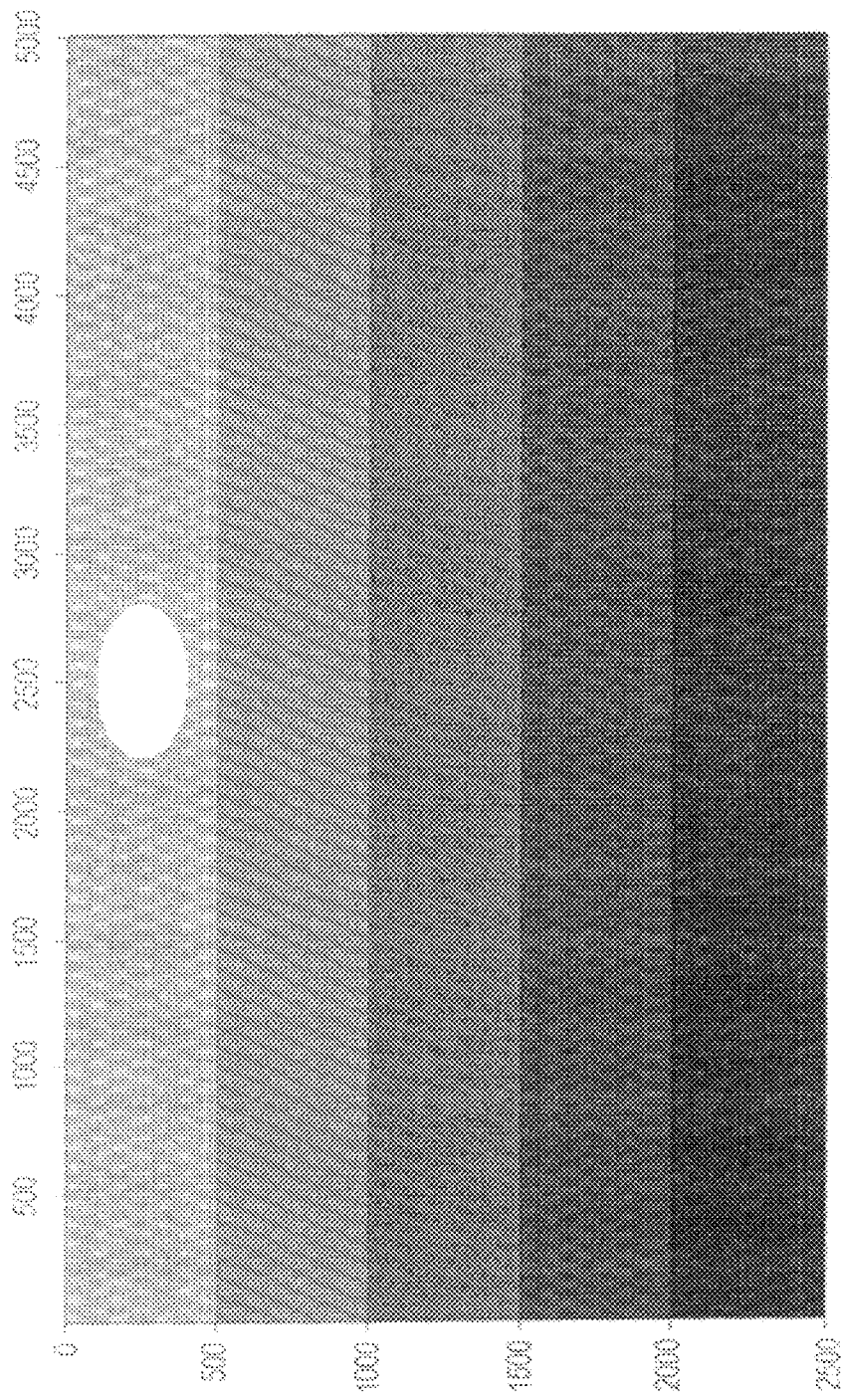
FIG. 2 is an illustration in accordance with the prior art of a simple layered model with a buried velocity anomaly.
Figure 3A:
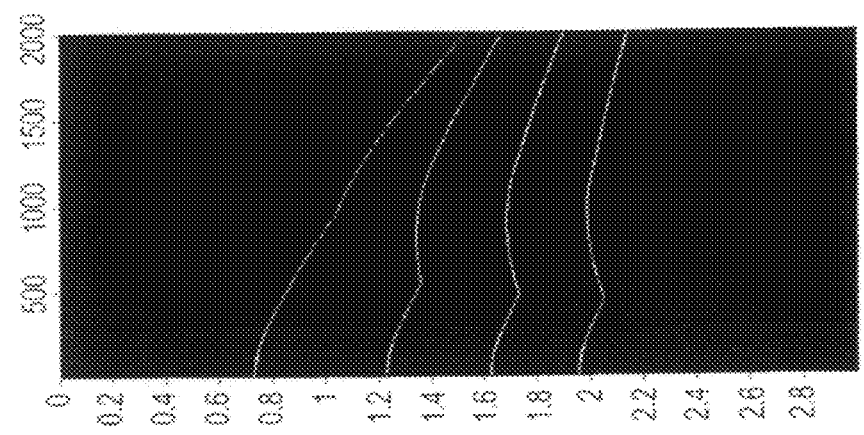
FIG. 3 are representative graphical plots in accordance with the prior art of common-mid-point gathers for the anomaly of FIG. 2 taken at three different distances.
Figure 3B:
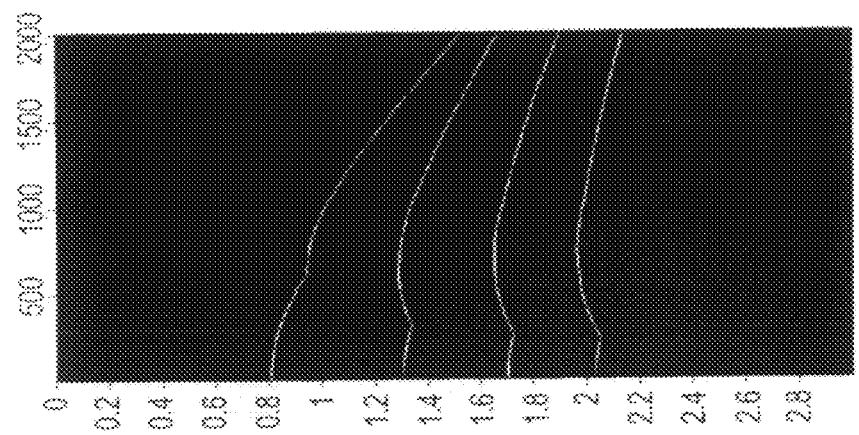
Figure 3C:
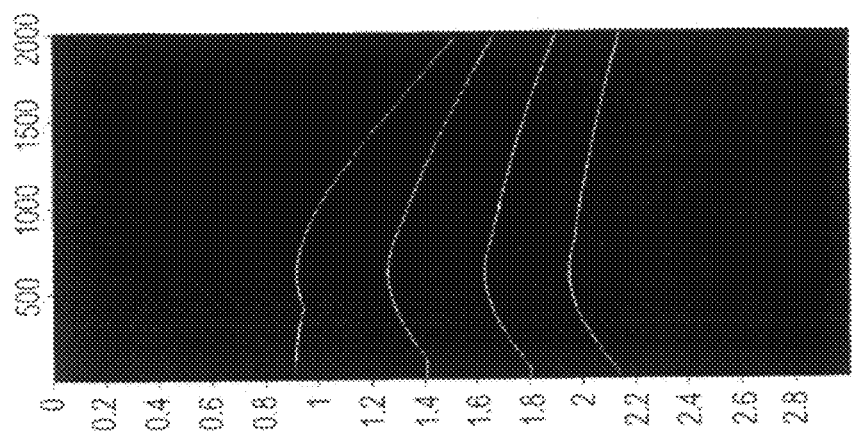
Figure 4:
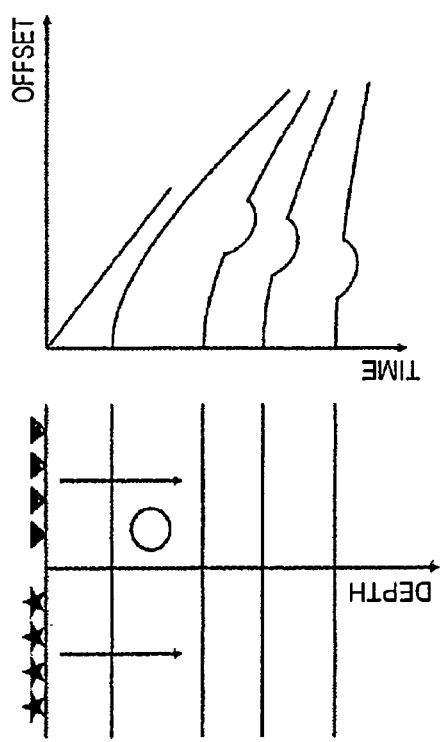
FIG. 4 includes a schematic illustration in accordance with the prior art of a simple layered model with a buried anomaly on the left and its corresponding common-mid-point gather to the right.
Figure 5:
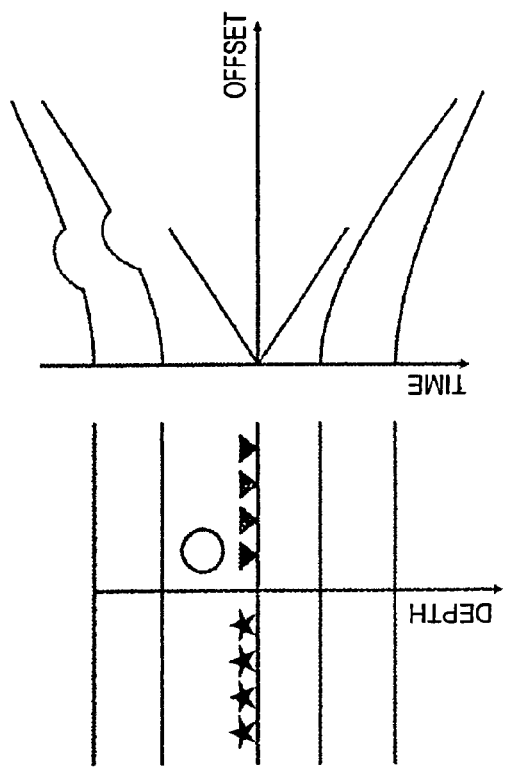
FIG. 5 includes a schematic illustration in accordance with the prior art of the buried anomaly of FIG. 4 on the left and the corresponding common-mid-point gather after redatuming with true traveltime operators on the right.
Figures 6, 7:
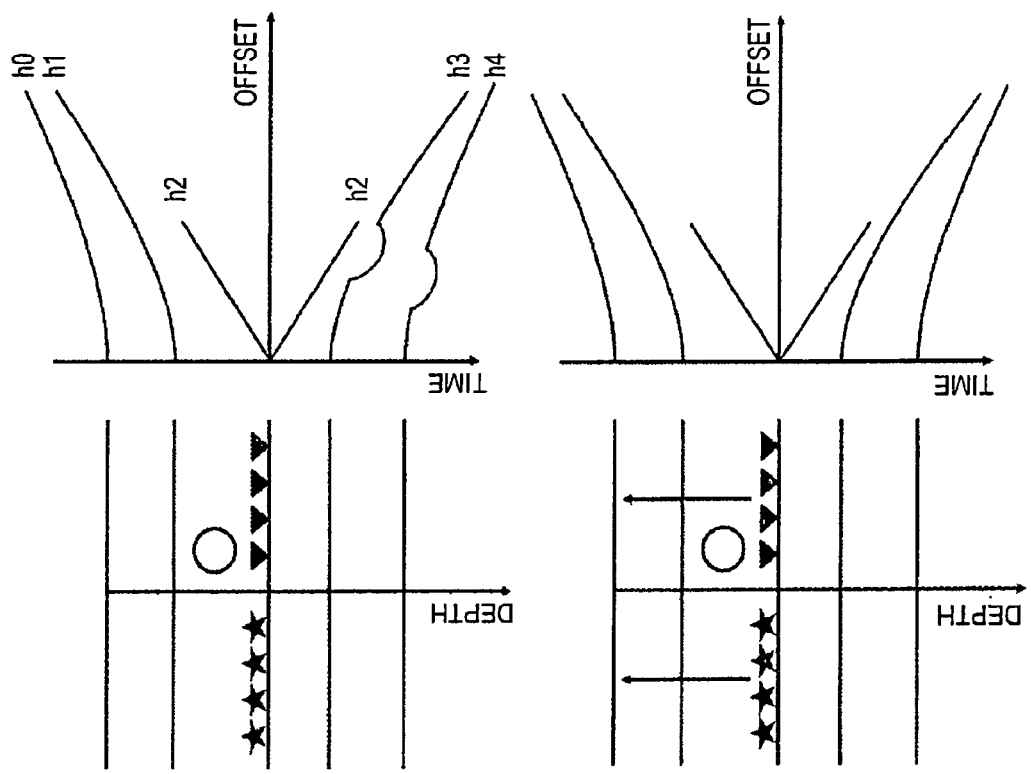
FIG. 6 includes a schematic illustration in accordance with the prior art of the buried anomaly of FIG. 4 on the left and the corresponding common-mid-point gather after redatuming with hyperbolic traveltime operators on the right.
FIG. 7 includes a schematic illustration of the buried anomaly of FIG. 4 on the left and the combined common-mid-point gather from two different redatuming results on the right.

By comparing FIGS. 5 and 6 which represents the CMP gather after redatuming with hyperbolic traveltime operators, it can be seen that the general, or hyperbolic, behavior is the same and the only difference is the location of the anomaly. Also, both the anti-causal part of FIG. 5 and the causal part of FIG. 6 do not have the anomaly imprint in them. If the two halves are combined as shown in the combined CMP gather from two different redatuming results of FIG. 7, a dataset is obtained that doesn't have the imprint of the anomaly in either the causal or the anti-causal part.

Figure 8:
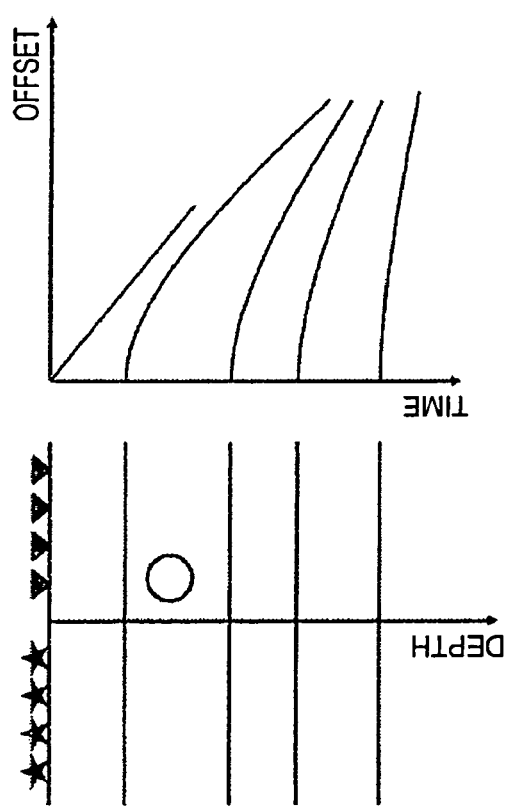
FIG. 8 includes a schematic illustration of the buried anomaly of FIG. 4 on the left and the combined common-mid-point gather after redatuming back to the surface with hyperbolic operators.

The data is now redatumed back to the surface using the hyperbolic operators which return the hyperbolic move-out of the behavior without introducing the non-hyperbolic component of the anomaly into any of the horizons. The result of this process is a dataset which starts from the surface without the anomaly imprint, as shown in the combined CMP gather after redatuming back to surface with hyperbolic operators of FIG. 8. The process of the invention resolves all the issues with the redatumed data at the target horizon that were described above. The process of redatuming with two sets of traveltime operators, combining the anomaly-free part of each redatumed dataset and then redatuming back to the surface with the hyperbolic operators is referred to herein as non-hyperbolic correction (NHC).

Example Using 2D Synthetic Data

Figure 9:
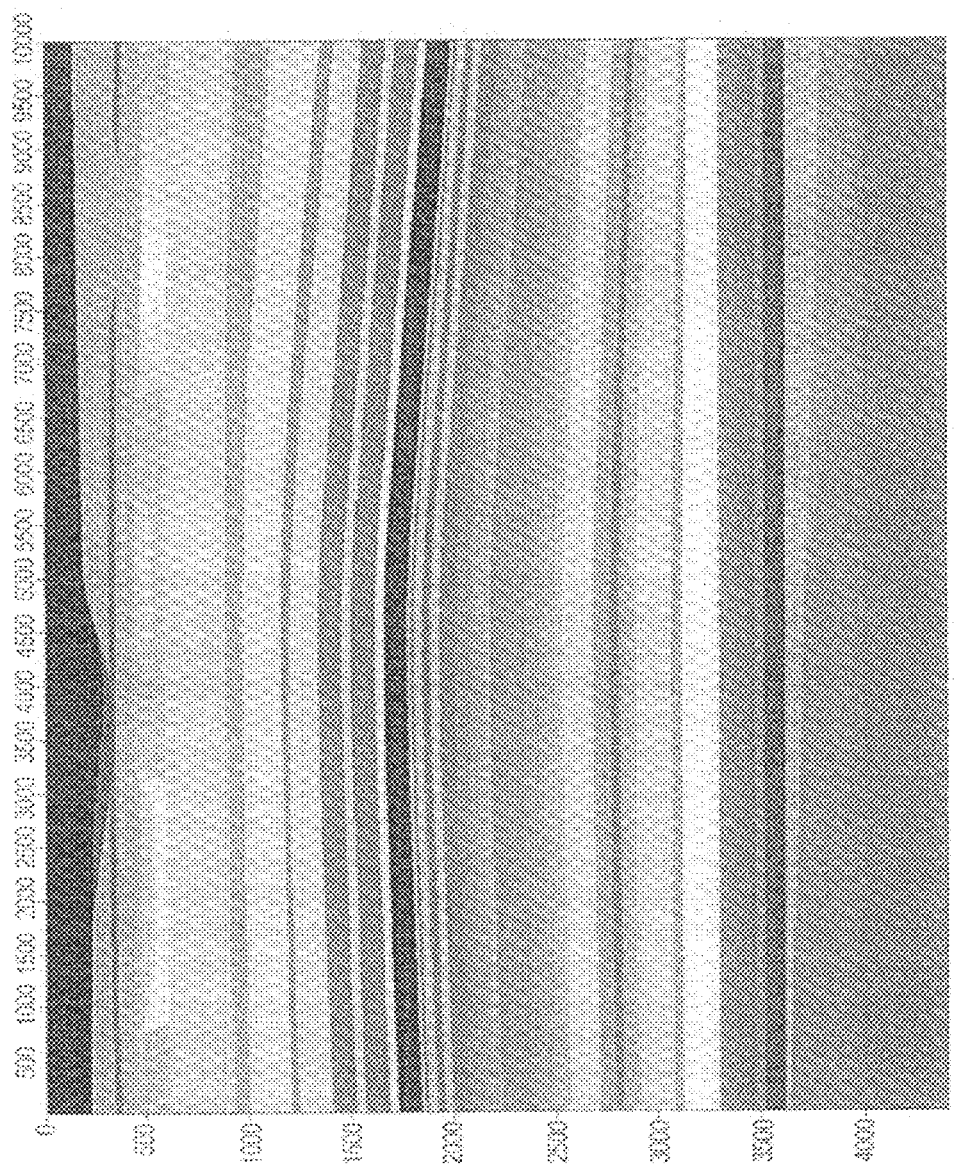
FIG. 9 is a synthetic velocity model of a specific subsurface combination of geophysical features.

An acoustic finite difference algorithm was used to create synthetic shot records for the synthetic velocity model depicted in FIG. 9, which represents a subsurface model containing a wadi, several layers with lateral velocity-variations embedded in the near surface and a number of smooth deep reflectors. The sources are located from x=0 m towards x=10000 m. The shot records are modeled with a moving split-spread geometry with an offset range of 4800 m and a source and receiver interval of 20 m. The synthetic shot records have been processed and a horizon-consistent velocity analysis was performed to obtain the brute stack of the data shown in FIG. 10 that depicts the surface stack before applying the NHC method of the present invention.

Figure 10:
FIG. 10 is a surface stack of the model of FIG. 9 before applying the non-hyperbolic correction method of the present invention.

FIG. 10 shows that all the horizons from t=0.8 sec and after appear to be broken. This is the result of the block-shaped layers visible in FIG. 9 at around z=600 m. As noted above, these discontinuities cannot be resolved using static corrections for two reasons: the buried anomalies are below the first few layers and because the imprint of the anomalies is dynamic.

Since the velocity analysis was done on this data, the stacking velocity of the target horizon of approximately t=1.05 sec was used as the hyperbolic component of the horizon. A cross-correlation (or trim statics) was performed in the CMP domain on a short window around that target horizon. The cross-correlation results are approximately equal to the NMO error described above. By adding the stacking velocity to the NMO error, a two-way time picks is obtained of the target horizon including all the anomalies' effects. Notice that there are numerous ways to get the target horizon picks in the pre-stack domain. As will be understood by one of ordinary skill in the art, choosing the best method to pick the horizon will depend on the type of signal, noise and anomalies that are present in the seismic data.

Although getting the picks of the target horizon can require additional effort, this step provides benefits which make it worthwhile. For example, quality control can be applied to the static model using these picks because the NMO error should not have any surface-consistent component in it. If any surface-consistent components are observed in the error, the data can be fed back to the static model. Also, the stacking velocity can be calculated from the picks by fitting a hyperbola in the CMP domain and then comparing it to the velocity analysis results. Any difference between the two velocities would indicate an error in either the velocity analysis or the picking process.

Figure 11:
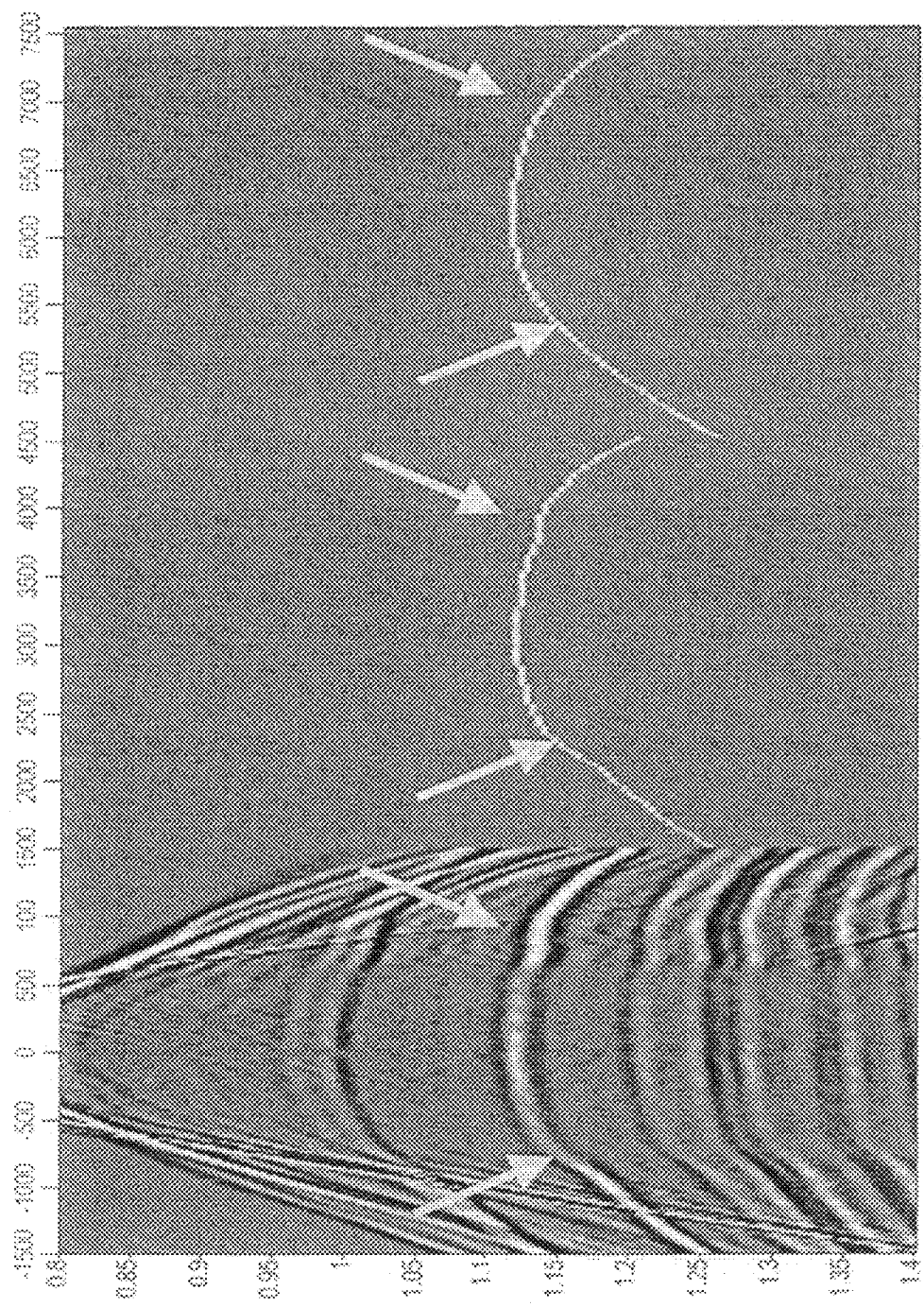
FIG. 11 is a comparison among a shot, the horizon picks and the hyperbolic correction of the horizon.

FIG. 11 provides a comparison between a shot, the horizon picks and the hyperbolic component of the horizon. It can be seen that the horizon pick and the hyperbolic component of the horizon have the same general trend, but differ when there is a sudden change in the event.

After obtaining both the horizon picks and the hyperbolic component, a parameterized non-linear global inversion algorithm was run on each of them to estimate the true one-way traveltime operators, as well as the hyperbolic one-way traveltime operators. The Genetic Algorithm (GA) was chosen because it converges very quickly to a satisfying solution. However, as will be apparent to one of ordinary skill in the art, any inversion algorithm that produces good traveltime operators can be used.

Figure 12:
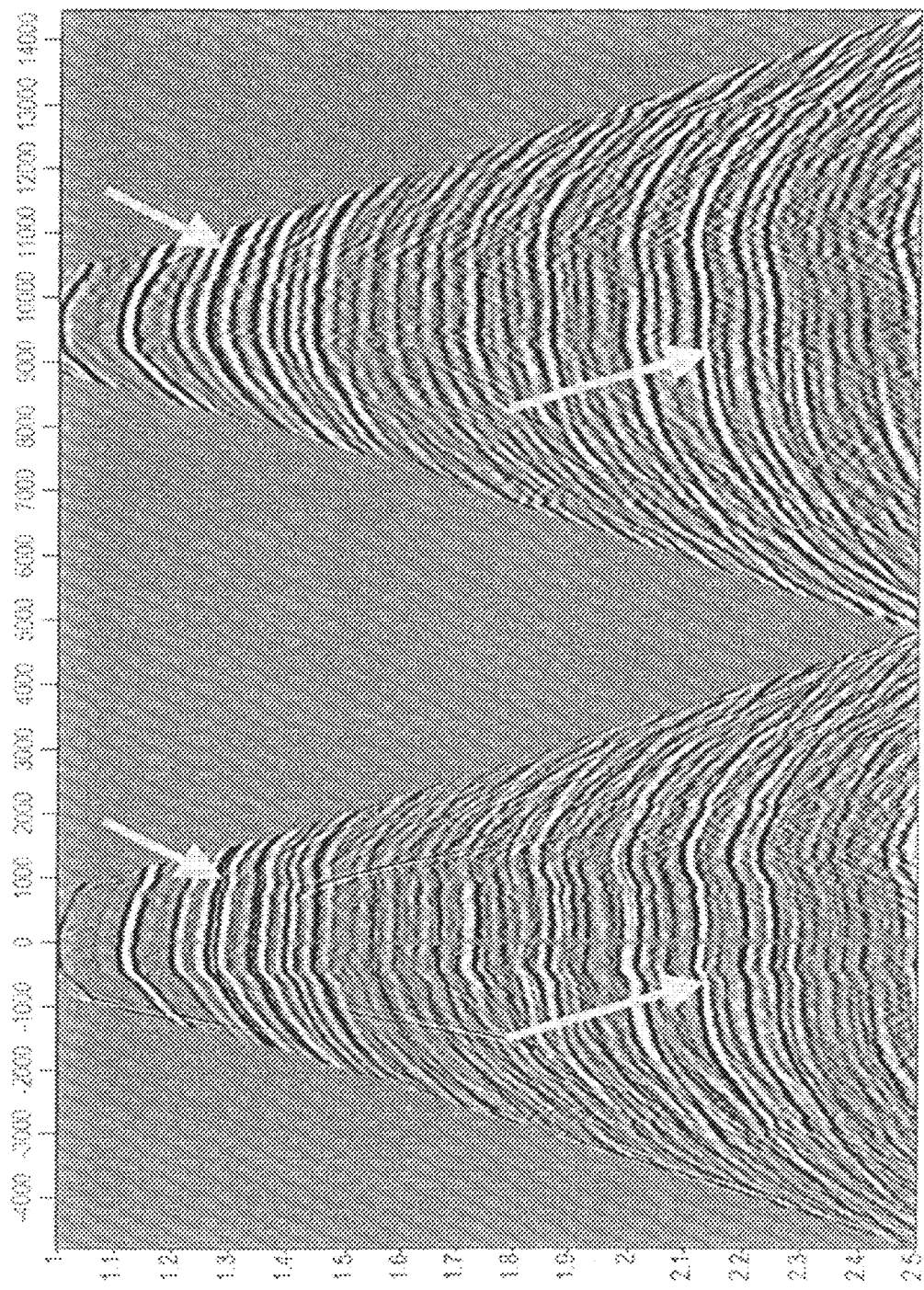
FIG. 12 is a comparison of a shot on the left before applying the non-hyperbolic correction method of the invention and on the right after such correction has been applied.
Figure 13:
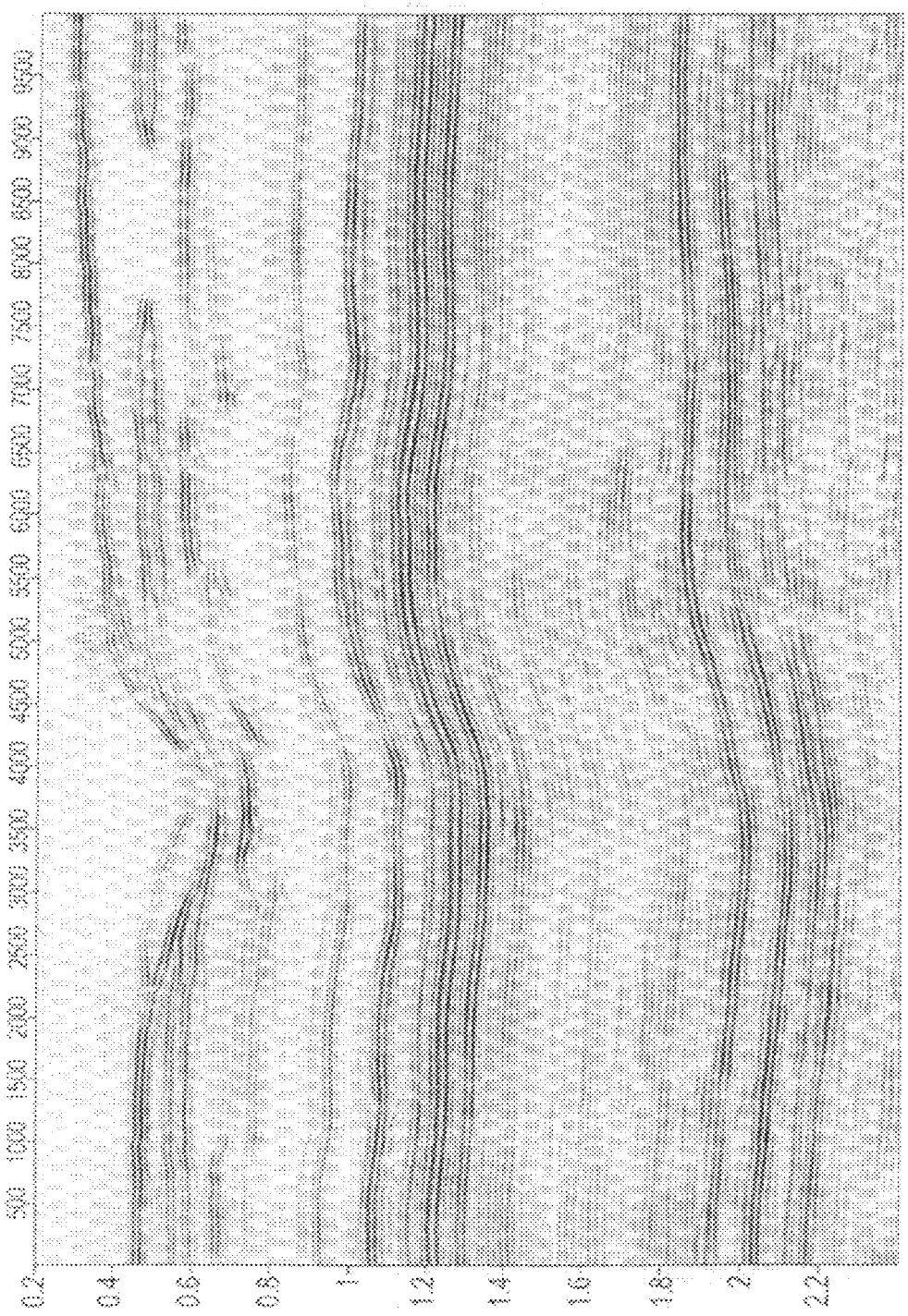
FIG. 13 is a surface stack after applying the non-hyperbolic correction method of the invention.
Figure 14B:
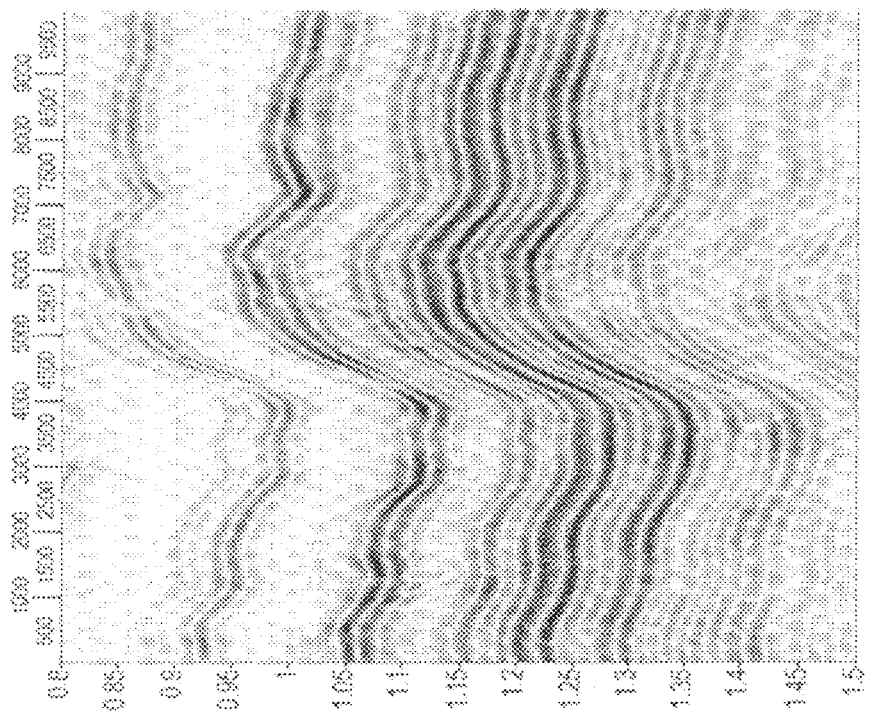
FIG. 14 is a comparison of the stacked image before non-hyperbolic correction on the left side and after correction on the right side for the indicated time interval.
Figure 14A:
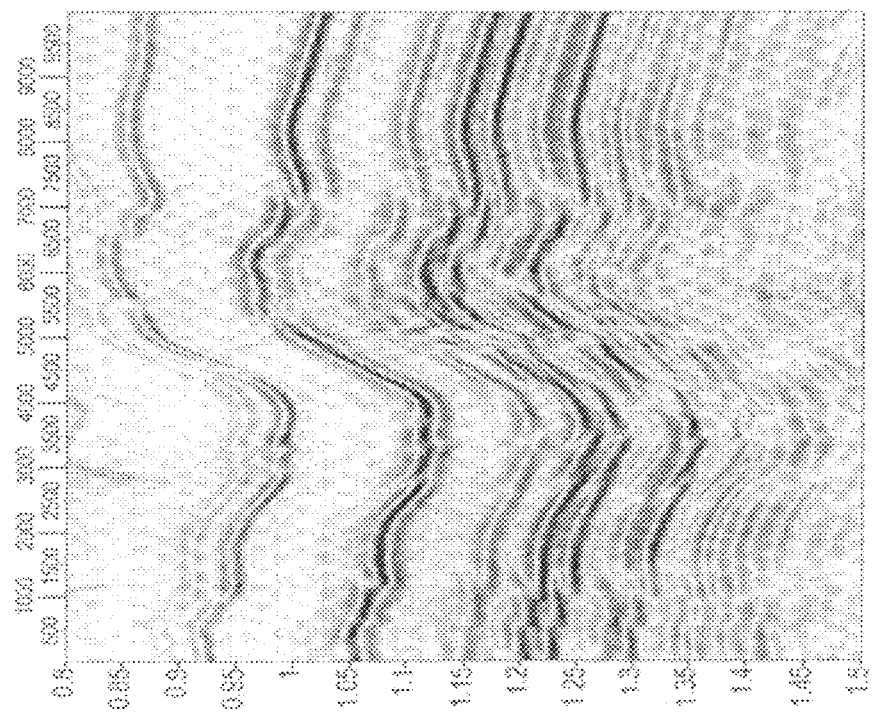
Figure 15B:
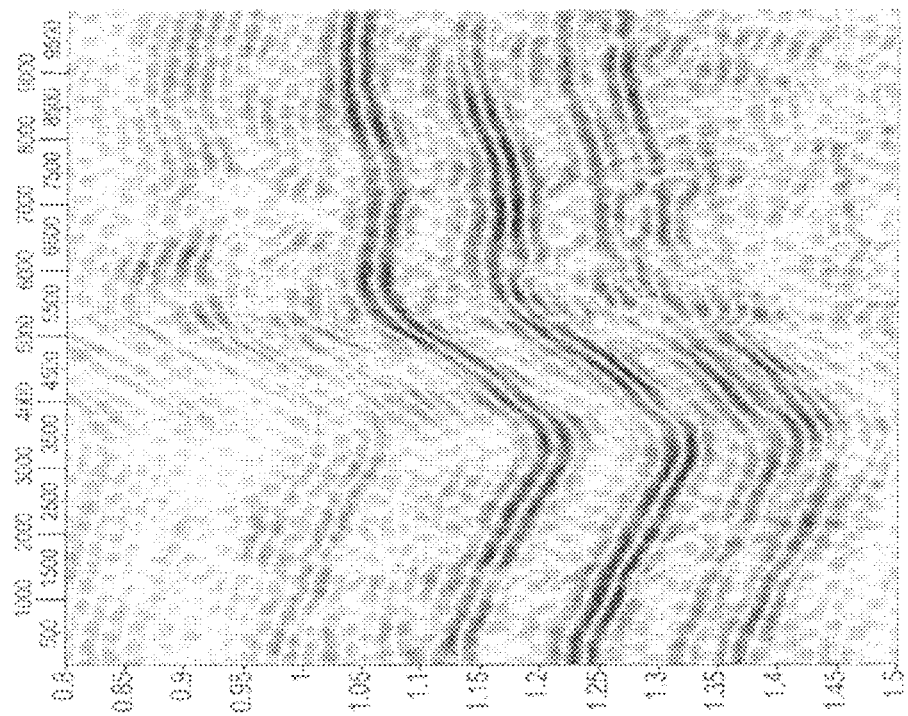
FIG. 15 is a comparison of the stacked image similar to FIG. 14 for the indicated later time interval.
Figure 15A:
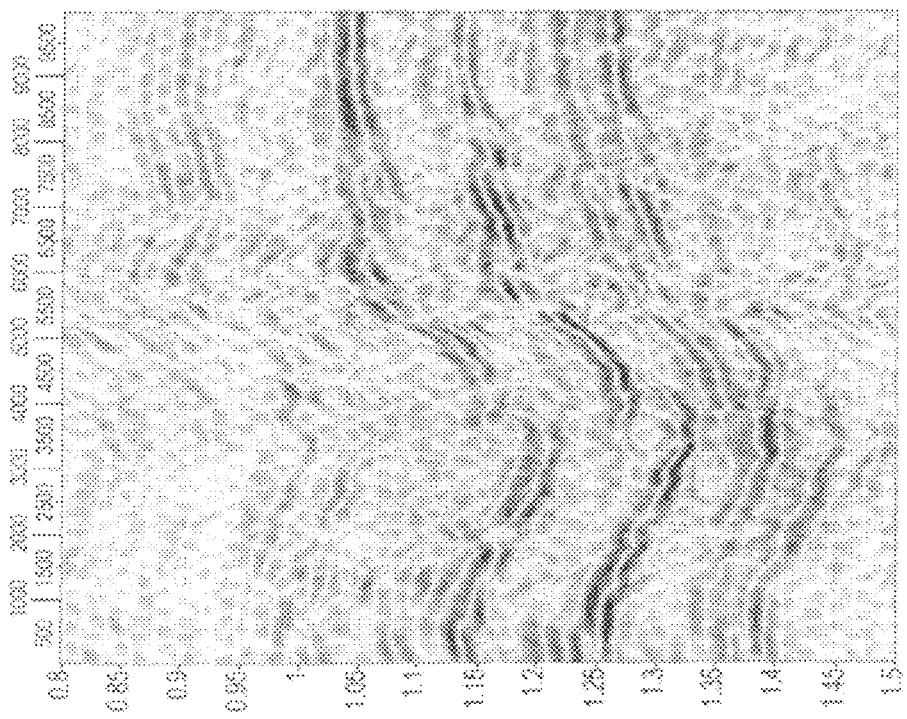

After estimating both sets of operators, the NHC was applied as described above. FIG. 12 shows comparison between a shot before and after applying NHC. The new shot after NHC is very similar to the original shot except that it doesn't have any sharp changes in the events, selected ones of which are high-lighted by the arrows. FIG. 13 shows the final surface stack after applying the NHC method. FIGS. 14 and 15 are comparisons between the stacked image before and after NHC zooming at different parts of the stacks. Specifically, FIG. 14 is a comparison of the stacked image before and after application of the NHC method from t=0.8 to 1.5 sec; and FIG. 15 is a comparison of the stacked image before and after NHC from t=1.6 to 2.3 sec.

Referring now to FIGS. 16 and 17, comparisons between horizon velocity analyses (HVA) for the target horizon around t=1.05 sec and a second horizon around t=1.25 sec before and after NHC are shown.

From the above description, it will be understood that the method of the invention uses traveltime operators to properly remove the imprint of buried velocity anomalies that conventional static corrections cannot resolve. The NHC method has advantages over prior art redatuming techniques, which advantages include the preservation of the reference time as well as the move-out of the events.

Figure 18:
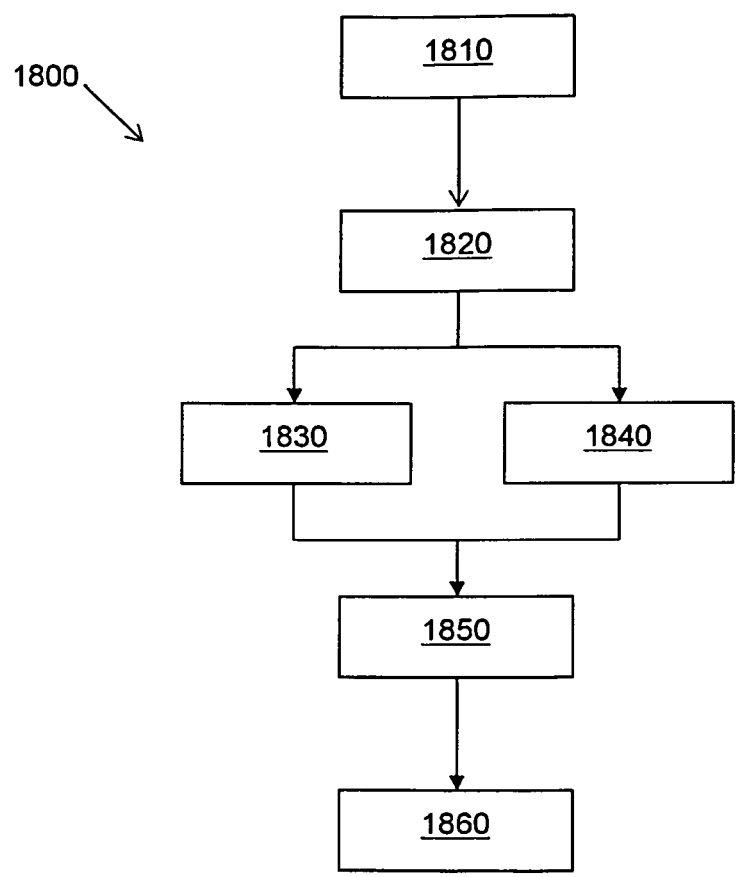
FIG. 18 is a process flow diagram of steps carried out using the system and method of the present invention.

FIG. 18 shows a preferred embodiment of the present invention, representing a process flowchart 1800 of steps.

In step 1810, the stacking velocity and the NMO error of a target horizon are estimated.

In step 1820, two sets of one-way traveltime operators (true and hyperbolic) are estimated by applying an inversion algorithm.

In steps 1830 and 1840, seismic data is received and is separately redatumed with both sets of operators from step 1820, to produce two new datasets. In particular, in step 1830 the true one-way traveltime operator is used to redatum the seismic data and obtain the causal part, and in step 1840 the hyperbolic one-way traveltime operator is used to redatum the seismic data and obtain the anti-causal part. When the data from surface to the target horizon is redatumed using each of these hyperbolic operators, a new dataset is obtained that is similar to the CFP redatumed data, except that the anomaly imprint will remain in its location as the causal part of the data and will not shift to the shallower horizons as does the anti-causal part. The results from CFP redatuming and hyperbolic-operator redatuming are similar except in the part (causal vs. anti-causal) that has the imprints of the anomalies.

In step 1850, the causal part from the true operators redatuming with the anti-causal part from the hyperbolic operators redatuming are combined, to obtain a dataset that does not include the imprint of the anomalies. By combining these two clean parts from these two redatuming processes, i.e., the causal part from CFP redatuming and anti-causal part from hyperbolic-operators redatuming, the method of the invention produces a dataset that doesn't have the imprint of the anomaly in either the causal or the anti-causal part.

In step 1860, the dataset obtained in step 1850 is redatumed back to the surface using the hyperbolic operators. This returns the hyperbolic move-out of the behavior without putting back the non-hyperbolic component of the anomaly to any horizon. The result of this process is a dataset that is referenced to the surface without the anomaly imprint. In accordance with the method of the invention, all the negative issues with the redatumed data at the target horizon are resolved.

Figure 19:
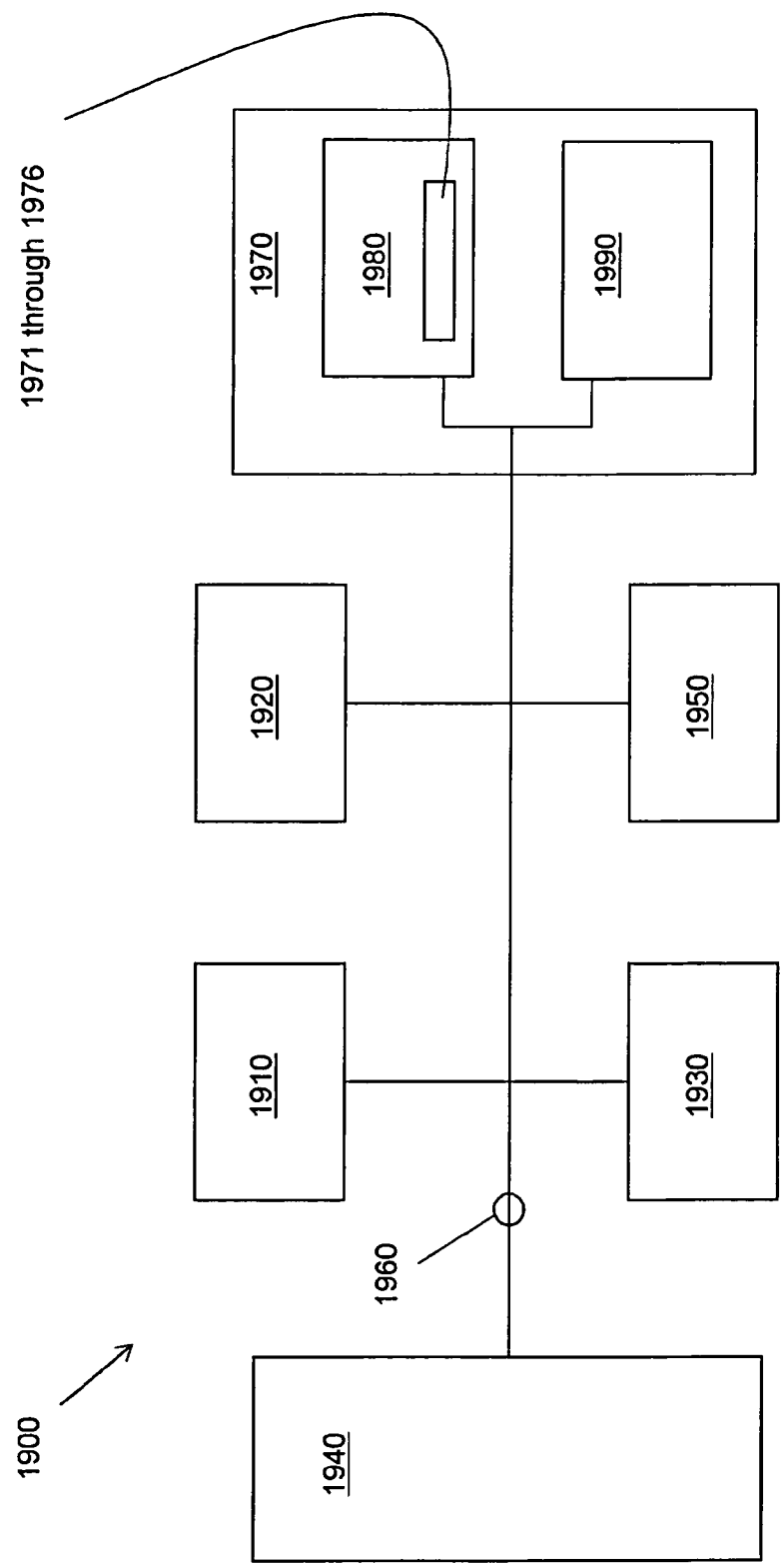
FIG. 19 is a block diagram of a system for implementing the invention.

FIG. 19 shows another preferred embodiment of the present invention, implemented in a computer system 1900, with a number of modules. Computer system 1900 includes a processor 1910, such as a central processing unit, an input/output interface 1920 and support circuitry 1930. In certain embodiments, where the computer 1900 requires direct human interaction, a display 1940 and an input device 1950 such as a keyboard, mouse or pointer are also provided. The display 1940, input device 1950, processor 1910, input/output interface 1920 and support circuitry 1930 are shown connected to a bus 1960 which also connects to a memory unit 1970. Memory 1970 includes program storage memory 1980 and data storage memory 1990. Note that while computer 1900 is depicted with the direct human interface components of display 1940 and input device 1950, programming of modules and importation and exportation of data can also be accomplished over the interface 1920, for instance, where the computer 1900 is connected to a network and the programming and display operations occur on another associated computer, or via a detachable input device, as are well known in the art for interfacing programmable logic controllers.

Program storage memory 1980 and data storage memory 1990 can each comprise volatile (RAM) and non-volatile (ROM) memory units and can also comprise hard disk and backup storage capacity, and both program storage memory 1980 and data storage memory 1990 can be embodied in a single memory device or separated in plural memory devices. Program storage memory 1980 stores software program modules and associated data, and in particular stores: a stacking velocity and NMO error estimating module 1971; a one-way traveltime operators estimating module 1972 that estimates true and hyperbolic one-way traveltime operators; an initial causal redatuming module 1973 that applies the true one-way traveltime operator to derive a causal part of a dataset; an initial anti-causal redatuming module 1974 that applies the hyperbolic one-way traveltime operator to derive an anti-causal part of a dataset; a combinatory module 1975 that combines the causal and anticausal parts of the dataset; and a final redatuming module 1976 that redatums the combined dataset back to the surface. Data storage memory 1990 stores data used and/or generated by the one or more modules of the present invention.

Stacking velocity and NMO error estimating module 1971 estimates the stacking velocity and the NMO error of a target horizon. One-way traveltime operator estimating module 1972 estimates two sets of one-way traveltime operators by applying an inversion algorithm. Initial redatuming module 1973 receives seismic data and separately redatums the seismic data with both sets of operators from module 1972, to produce two new datasets. Combinatory module 1974 combines the causal part from the true operators redatuming with the anti-causal part from the hyperbolic operators redatuming, to obtain a dataset that does not include the imprint of the anomalies. Final redatuming module 1975 redatums the dataset obtained in module 1974 back to the surface using the hyperbolic operators.

It is to be appreciated that the computer system 1900 can be any general or special purpose computer such as a personal computer, minicomputer, workstation, mainframe, a dedicated controller such as a programmable logic controller, or a combination thereof. While the computer system 1900 is shown, for illustration purposes, as a single computer unit, the system can comprise a group/farm of computers which can be scaled depending on the processing load and database size. The computer system 1900 can serve as a common multitasking computer.

The computing device 1900 preferably supports an operating system, for example, stored in program storage memory 1990 and executed by the processor 1910 from volatile memory.

The invention thus applies hyperbolic operators and the combining of causal and anti-causal in order to obtain the corrected data set for use in imaging components of different redatuming steps. These two new concepts provide all of the benefits of CFP redatuming while both preserving the shallower data without degradation, as well as referencing the data back to the surface to preserve the move-out behavior.

The system and method of the present invention differs from conventional statics solutions in the following significant aspects: it doesn't assume that velocity anomalies are at the surface; it doesn't assume that velocity anomalies have low velocities; and it doesn't assume a simple layered earth model with vertical ray-paths.

It also differs from conventional redatuming solutions in that it doesn't require any knowledge about velocity-depth model of the near surface; and it requires traveltimes operators only at the target horizon.

It differs from CFP redatuming in that (a) it preserves the original acquisition reference of the data; (b) it preserves the hyperbolic move-out of the data; (c) it preserves the arrival time of the data; and (d) it doesn't degrade the data above the target horizon because it totally removes the anomaly, rather than merely just shifting it to shallower horizons.

This invention removes the imprint of near surface complexities as well as buried anomalies from the seismic image while keeping the original acquisition reference. The most difficult task in this area of seismic data analysis is properly characterizing the near surface and its properties. In the method of the present invention, the only requirement is the total effect of the near surface on the layers below it without the need to know the exact description of that near surface. The method removes the total effects of all near-surface and buried anomalies from the data and then puts back data relating only to the hyperbolic, smoothly-behaving component of the layers that were removed.

The invention claimed is:

1. A method for improving seismic images by correction of distortions in the underlying input seismic data caused by a near-surface anomaly that produces a non-hyperbolic move-out component of the seismic reflection below the anomaly, the method comprising:
   a. redatuming the input seismic data to go from the surface to a target horizon using true one-way traveltime operators to provide a first new redatuming dataset;
   b. redatuming the input seismic data using hyperbolic one-way traveltime operators to provide a second new redatuming dataset; and
   c. redatuming the combination of a first causal part of the first new redatuming dataset and an anti-causal second part of the second redatuming dataset to go from the target horizon back to the surface using hyperbolic one-way traveltime operators,
to thereby provide a dataset that is referenced to the surface without an imprint of the anomaly.

2. A method for improving seismic images by correction of distortions in the underlying input seismic data caused by a near-surface anomaly that produces a non-hyperbolic move-out component of the seismic reflection below the anomaly, the method comprising:
   a. estimating true and hyperbolic one-way traveltime operators;
   b. redatuming the input seismic data to go from the surface to a target horizon using the true one-way traveltime operators to provide a causal redatuming dataset;
   c. redatuming the input seismic data to go from the surface to a target horizon using the hyperbolic one-way traveltime operators to provide an anti-causal redatuming dataset;
   d. combining the causal and anti-causal redatuming datasets into a combined redatuming dataset;
   e. redatuming the combined redatuming dataset to go from the target horizon back to the surface using the hyperbolic one-way traveltime operators,
to thereby provide a dataset that is referenced to the surface without an imprint of the anomaly.

3. The method of claim 1 in which the true one-way traveltime operators are derived from the true two-way traveltime of the target horizon, and the hyperbolic one-way traveltime operators are derived from the hyperbolic component of the target horizon.

4. The method of claim 3 in which the horizon is selected in the prestack data domain or by stacking velocity analysis followed by trim statics analysis around the target horizon.

5. The method of claim 1 in which the two sets of true and hyperbolic two-way traveltimes are converted, respectively, to one-way traveltime operators utilizing an inversion algorithm.

6. The method of claim 5 in which the inversion algorithm is a genetic algorithm.

7. A system for improving seismic images by correction of distortions in the underlying input seismic data caused by a near-surface anomaly that produces a non-hyperbolic move-out component of the seismic reflection below the anomaly, the system comprising:
   a memory that stores calculation modules and data;
   a processor coupled to the memory;
   an initial causal redatuming module that redatums the input seismic data to go from the surface to a target horizon using true one-way traveltime operators to provide a causal part of a new redatuming dataset;
   an initial anti-causal redatuming module that redatums the input seismic data to go from the surface to a target horizon using hyperbolic one-way traveltime operators to provide an anti-causal part of the new redatuming dataset;
   a combinatory module that combines the causal and anti-causal parts of the new dataset; and
   a final redatuming module that redatums the combination of the causal and anti-causal parts of the new dataset to go from the target horizon back to the surface using the hyperbolic one-way traveltime operators, to thereby provide a final dataset that is referenced to the surface without an imprint of the anomaly.

8. A system for improving seismic images by correction of distortions in the underlying input seismic data caused by a near-surface anomaly that produces a non-hyperbolic move-out component of the seismic reflection below the anomaly, the system comprising:
   a memory that stores calculation modules and data;
   a processor coupled to the memory;
   a one-way traveltime operators estimating module that estimates true and hyperbolic one-way traveltime operators;
   an initial causal redatuming module that redatums the input seismic data to go from the surface to a target horizon using the true one-way traveltime operators to provide a causal part of a new redatuming dataset;
   an initial anti-causal redatuming module that redatums the input seismic data to go from the surface to a target horizon using the hyperbolic one-way traveltime operators to provide an anti-causal part of the new redatuming dataset;
   a combinatory module that combines the causal and anti-causal parts of the new dataset;
   a final redatuming module that redatums the combination of the causal and anti-causal parts of the new dataset to go from the target horizon back to the surface using the hyperbolic one-way traveltime operators, to thereby provide a final dataset that is referenced to the surface without an imprint of the anomaly.

9. The system of claim 7 in which the true one-way traveltime operators are derived from the true two-way traveltime of the target horizon, and the hyperbolic one-way traveltime operators are derived from the hyperbolic component of the target horizon.

10. The system of claim 9 in which the horizon is selected in the prestack data domain or by stacking velocity analysis followed by trim statics analysis around the target horizon.

11. The system of claim 7 in which the two sets of true and hyperbolic two-way traveltimes are converted, respectively, to one-way traveltime operators utilizing an inversion algorithm.

12. The system of claim 11 in which the inversion algorithm is a genetic algorithm.

* * * * *